May 5, 1959
B. C. W. HAGELIN
2,884,712
CIPHERING DEVICE
Filed Sept. 22, 1953
2 Sheets-Sheet 1
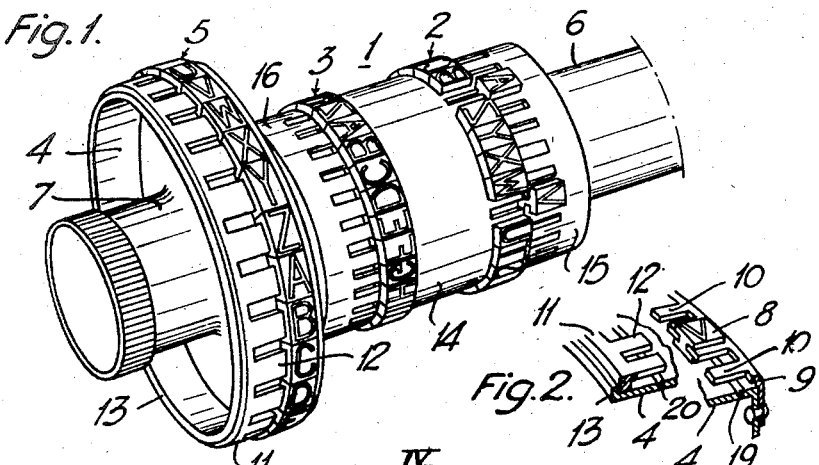
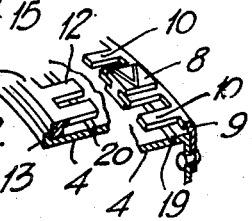
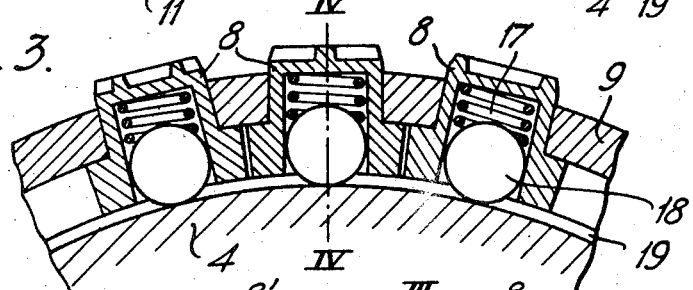
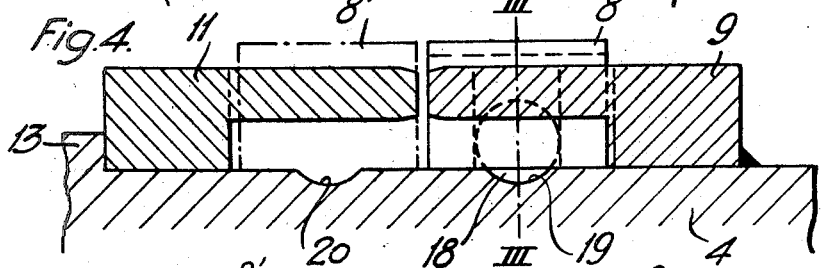
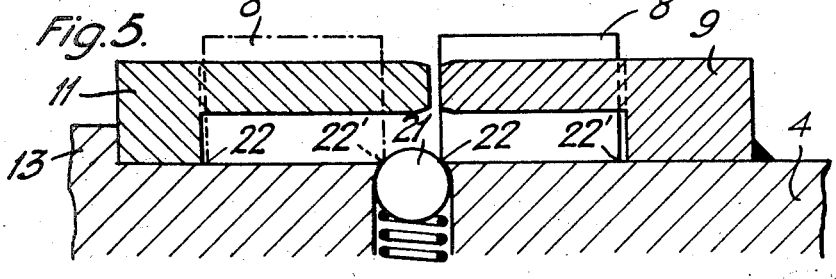
INVENTOR:
BORIS C.W. HAGELIN
ATTORNEYS:
Moore & Hall May 5, 1959

B. C. W. HAGELIN 2,884,712

CIPHERING DEVICE

Filed Sept. 22. 1953

INVENTOR:
BORIS C. W. HAGELIN
BY:
Moore of Hall
ATTORNEYS

# United States Patent Office 2,884,712
Patented May 5, 1959

2,884,712

CIPHERING DEVICE

Boris Caesar Wilhelm Hagelin, Zug, Switzerland

Application September 22, 1953, Serial No. 381,678

Claims priority, application Switzerland
November 17, 1952

9 Claims. (Cl. 35—2)

This invention relates to sign wheels with annularly arranged series of letters or numerals which are intended either to be read through a window or to be printed. The object of the invention is to provide such a wheel in which the separate signs can be displaced in any convenient manner without difficulty.

This feature is of particular value in ciphering machines as by this means there can be obtained an increase in the number of the possible variations.

To this end in accordance with the invention a wheel having letters or numbers is provided, the letters, numbers or other signs of which are provided on carriers separated from one another in the circumferential direction and which are movably arranged in such manner that they can be displaced into different relative positions without removal from the wheel.

A number of embodiments of the invention are illustrated in the accompanying drawing in which Fig. 1 is a wheel or a roll in perspective provided with three series of letters.

Fig. 2 is a perspective view partly in section of part of the periphery of a wheel with letters in accordance with the invention, different details being shown separated.

Fig. 3 is a part of a cross section of the periphery of a wheel with letters with locking means for the sign-carrying parts.

Fig. 4 is a longitudinal section on the line IV—IV in Fig. 3 and

Fig. 5 is a similar section of a modified locking device.

Figure 1A:
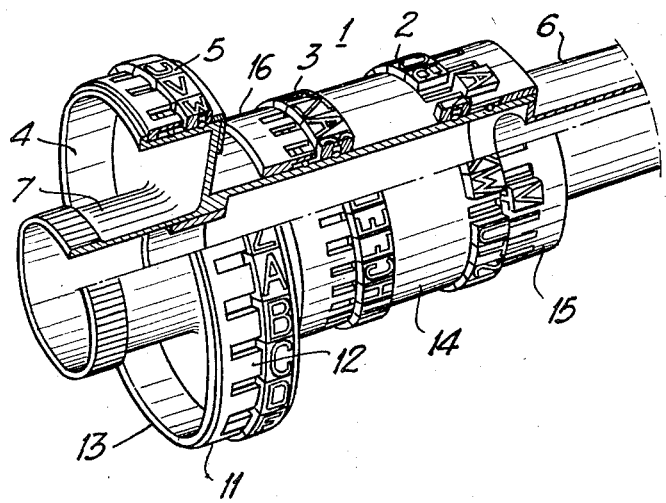
Fig. 1a is a sectional view of the wheel or roll of Figure 1.

As shown, the reference numeral 1 indicates a roll with two rows of letters 2 and 3 surrounding the same and separated axially; an end part 4 formed as a wheel of greater diameter than the roll carries a row of letters 5. The roll is formed at its ends with hub portions 6 and 7 for mounting on a shaft, not shown. The row of letters 5 consists of a series of elements or carriers 8 for the signs extending around the roll and separated from one another in the circumferential direction (Fig. 2), which are axially movable, being mounted on a ring firmly connected with the wheel 4. This ring presents axially directed teeth 10 each pair of which engages in a groove in a carrier 8 and serve as an axial guide for the carrier. On the wheel 4 moreover is rotatably mounted a ring 11 which is provided with teeth 12 corresponding to the teeth 10 and facing the same so that when the teeth 10 and 12 on the two rings 9 and 11 come opposite one another the carriers can be moved from one ring to the other.

The two remaining rows of letters 2 and 3 are formed like those of the wheel 4. They each have in fact a fixed ring-like part 14 and a ring 15 or 16 each of the latter rings being so arranged in relation to the fixed ring 14 in the same way as the ring 11 is disposed in relation to the fixed ring 9. The members 4, 6, 7, 13 and 14 are all formed integrally with each other and the structure formed thereby is rotatable as a whole in a ciphering machine. The members 2, 3 and 5 are rigidly attached to this structure and also rotate with it.

The displacement of the letters is effected by setting the rotatably mounted ring 11, 15 or 16 so that its teeth come directly opposite the teeth of the fixed ring 9 or 14 whereupon the signs to be moved are moved with their carriers from the fixed to the rotatable ring. In the fixed ring there are thus formed as many gaps as there are carriers displaced. The rotatable ring is then turned until the carriers thereon in succession come opposite the gaps into which they are intended to be pushed. As soon as the carrier reaches the desired gap it is pushed into the gap so that it again occupies a position in a row of signs in the fixed ring although in a different position from previously. In this way the position of any desired number of signs can be interchanged with one another. Obviously at least two signs must be displaced each time.

In order that the signs will not be unintentionally shifted from the fixed to the rotatable ring a locking device is provided. This locking device can be arranged in various ways. For example, it may consist of a locking hook or a locking spring which is mounted on the wheel and releasably engages in the rotatable ring in that position in which the teeth 12 come directly opposite the carriers 8 whereby axial movement of the carriers from the fixed ring is prevented. From Figs. 3 and 4 it will be seen how the carriers contain balls 18 loaded by springs 17 which balls engage in annular grooves 19 and 20 in the wheel 4 in order to hold the carriers in their position in the fixed and in the rotatable ring (as shown in Fig. 4).

The locking device may however as shown in Fig. 5 consist of a row of spring loaded balls 21 arranged in a recess in the outer surface of the wheel 4 directly opposite a carrier 8 so that that balls engage on the opposite lower edges 22, 22' of the carriers 8 or 8' of the fixed or rotatable ring.

As will be seen from the drawing and the above description, the invention comprises a sign wheel having one or more annular rows of signs or letters in which the sequence of the signs of each row can be changed arbitrarily by simple means for use on devices such as cipher machines and may be part of a teleprinter device. Such machines are shown in my U. S. Patents Nos. 2,089,603; 2,394,765 and 2,765,364 among others. The printing or "reading" operation of the several annular rows of signs such as 2, 3 and 5 as well as their operation will depend upon the particular machine on which the wheel is applied and the manner in which it is integrated into such a machine.

In the preceding description is disclosed one embodiment of the invention in which the signs are arranged as a row extending circumferentially on the peripheral surface of a wheel or a roll. It will be understood, however, that the invention is not limited to this example. For example annular rows of signs may be arranged on the end face of a wheel in which case the separate signs are shifted radially for the purpose of interchanging the relative positions of the signs of one row.

While there have been described above various embodiments of the invention now believed to be preferred, it will be understood that other variations will suggest themselves to those skilled in the art. The appended claims are couched in generic terms intended to cover all such variations as fall within the true spirit of the invention.

I claim:

1. A device of the class specified comprising in combination, a wheel body, at least one annular set of circumferentially separate sign carriers on said wheel body, a seat in the wheel body for each individual sign carrier, a rotatable member provided on said wheel body adjacent each said set of sign carriers and having a set of seats corresponding to those of the wheel body and each adapted to receive an individual sign carrier and shift it into a position in register with any desired seat of the wheel body, the arrangement being such as to allow each individual sign carrier to be shifted between the two seats without affecting the positions of the other sign carriers.

2. A device of the class specified comprising in combination, a wheel body, a shaft therefor, a rigid rim on said wheel body, a rotatable rim mounted on the wheel body adjacent said rigid rim, said rims having each on its circumferential surface an annular set of circumferentially spaced axial grooves with the grooves of one rim corresponding in number and relative position to those of the other rim and with the grooves opening in the lateral surfaces of the rims facing each other, and sign carriers slidably mounted in the grooves of the rigid rim and each capable of being transferred to a groove of the rotatable rim without affecting the positions of the other sign carriers.

3. A device of the class specified comprising in combination, a wheel body, a shaft therefor, axially spaced rigid rims on said wheel body, a rotatable rim mounted on the wheel body adjacent each rigid rim, the rims of each such pair of rims having corresponding annular sets of axial grooves opening in the surfaces of the rims facing each other, and a set of sign carriers slidably mounted in the grooves of each rigid rim and displaceable into separate grooves of the respective rotatable rim for shifting purposes.

4. A device of the class specified comprising in combination, a wheel body, a shaft therefor, axially spaced rigid rims on said wheel body, a rotatable rim mounted on the wheel body adjacent each rigid rim, the rims of each such pair of rims having corresponding annular sets of axial grooves opening in the surfaces of the rims facing each other, a set of sign carriers slidably mounted in the grooves of each rigid rim and displaceable into separate grooves of the respective rotatable rim for shifting purposes, and separate means for locking the individual sign carriers against unintentional displacement in their positions in engagement with any of the respective rims.

5. A device as claimed in claim 4, in which the locking means comprise for each sign carrier a spring loaded ball positioned in a bottom opened cavity of the carrier so as to bear against the circumference of the wheel body for engaging with any of two annular grooves formed in said circumference opposite each rim.

6. A device as claimed in claim 4 in which the locking means comprise for each sign carrier a spring loaded ball positioned in a recess formed in the wheel body in a plane at right angles to the wheel axis which is situated intermediate between each rigid rim and the associated rotatable rim for allowing the ball to engage the exposed inner edge of the sign carrying member in any of its axial positions.

7. In combination in a sign device for ready interchange of characters of a cipher machine, a wheel having peripheral slots therein open at one edge thereof and substantially parallel to the axis of said wheel, a second wheel movably mounted with respect to said first wheel and having similar peripheral slots, the open ends of said slots facing each other, and sign carrying members constructed to fit into said slots and movable from one to the other thereof.

8. The combination set forth in claim 7, resilient means for holding said movable sign carrying members in a selected position.

9. A cipher device of the class described comprising in combination, a wheel body constructed for rotation about its longitudinal axis, a set of separate individual sign carriers movably mounted on said wheel body for motion along said longitudinal axis, a rotatably movable member provided on said wheel body adjacent said set of sign characters and constructed to receive said sign carriers individually and shift their relative positions in said set at least two at a time without disturbing the relative position of the unshifted sign carriers.

References Cited in the file of this patent

UNITED STATES PATENTS

| | | |
|---|---|---|
| 207,319 | Tatham | Aug. 20, 1878 |
| 336,266 | Smith | Feb. 16, 1886 |
| 448,019 | Garben | Mar. 10, 1891 |
| 676,313 | Healey | June 11, 1901 |
| 690,664 | Proctor | Jan. 7, 1902 |
| 723,288 | Lewis | Mar. 24, 1903 |
| 814,653 | Healey | Mar. 6, 1906 |
| 1,132,430 | Brogan et al. | Mar. 16, 1915 |
| 1,921,327 | Schimmel et al. | Aug. 8, 1933 |